March 17, 1959  H. M. FOX  2,877,504

METHOD OF BONDING PROPELLANT GRAIN TO METAL CASE

Filed Aug. 2, 1954

INVENTOR.
H. M. FOX

BY *Hudson & Young*

ATTORNEYS

United States Patent Office 2,877,504
Patented Mar. 17, 1959

2,877,504

METHOD OF BONDING PROPELLANT GRAIN TO METAL CASE

Homer M. Fox, Bartlesville, Okla., assignor to Phillips Petroleum Company, a corporation of Delaware Application August 2, 1954, Serial No. 447,002

11 Claims. (Cl. 18—59)

This invention relates to a method of bonding an object within a container. In one of its aspects this invention relates to a method for bonding solid rocket propellant grain to the motor case. In still another aspect, this invention relates to bonding a solid rocket propellant grain to a metal case by injecting the bonding agent into the annular space between the grain and the case through a suitable pressure fitting by use of a pressure gun.

A rocket motor commonly comprises a combustion chamber having an exhaust nozzle and a propellant grain contained within the chamber. The exhaust nozzle head is usually made separate from the rest of the motor chamber and is adapted to be attached to the remaining chamber. This head also usually incorporates a means for firing the propellant grain. Upon burning, the grain produces large volumes of gas under high pressure which are exhausted from the chamber through the nozzle at high velocity. The reaction resulting from the acceleration of the gas through the nozzle creates the propulsive thrust. For satisfactory operation, it is required that the burning rate of the propellant grain remain constant throughout the operation since fluctuations in the burning rate will at least cause erratic control of the rocket and, if pressure changes are severe enough, can rupture the rocket.

There are two common methods for supporting the propellant grain within the combustion chamber, one being to bond the grain in place as will be explained and the other being to support the grain in the chamber or case by means of springs or other mechanical means. Bonding has several advantages over the mechanical support. First of all, the grain is uniformly supported at all points and is therefore less subject to high localized loads and makes the motor and grain more able to withstand greater stresses such as those due to acceleration, dropping, vibration and burning stresses. Also such bonding gives better protection against burning along the grain sides. However, all grains are not capable of being bonded by present methods.

A common method of filling the combustion chamber with solid propellant grain is by raising the propellant to elevated temperatures and pouring it into place and then allowing it to solidify by cooling. During cooling, a certain amount of contraction takes place causing the grain to pull away from the motor chamber walls.

Another method used for preparing the combustion chamber is to first cast the propellant grain separate from the motor, for example, in the shape of a cylindrical stick and other shapes adapted to fit within the motor chamber. In this latter case, the propellant grain is cast in a mold using molten propellant and the propellant is allowed to cool and solidify. Other methods of preforming a propellant grain include pressure molding and extrusion methods. After preforming, the grain is usually passed through an aging procedure, which may involve setting and curing, according to well known procedures. The grain surface except for the burning surface is coated with a layer of a restricting material by such methods as dipping, spraying, brushing and the like. The function of this coating is to adhere closely to the walls of the grain and thus confine the burning to the uncoated surface when the grain is fired. The coated grain is then placed in the motor chamber. It is extremely difficult to get a tight fit between grain and chamber by this method.

These rocket motors often are carried through periods of wide temperature ranges prior to use. The grain often will have a temperature coefficient of expansion of 15 to 20 times that of the steel casing. If this grain is spaced too close to the chamber walls, the pressure created by thermal expansion will, at least, cause the grain to develop stress cracks and possibly rupture the metal casing. Now when the engine is fired, the firing will take place along all exposed surfaces including the thermal cracks and the space created by contraction and pulling away from the chamber walls. Such irregularities in burning are highly undesirable as excessive pressures are produced which have been known to rupture the rocket engine.

The rocket grain to which this invention is especially useful are solid propellants which can be cast, pressure molded or extruded as solid masses. These grains can be mono-based, that is consisting of a single material which contains sufficient oxygen to sustain its own combustion such as nitrocellulose; double-based or consisting of two monopropellants such as nitrocellulose and nitroglycerine; or these grains can be, and preferably are, composite propellants. The composite propellants comprise an oxidant such as ammonium nitrate, ammonium perchlorate, and potassium perchlorate held together by a binder which is also, generally, a fuel. These binder materials can be asphaltic or other thermoplastic material or they can be a rubber or other polymer which achieves its strength as a result of vulcanization or other types of curing. One preferred binder material is a copolymer of 1,3-butadiene and 2-methyl-5-vinylpyridine. In general, the binder should contain a high percent of hydrogen and carbon since these materials have high heats of combustion and tend to generate large volumes of gas.

The thermoplastic materials are generally cast with an oxidizing agent uniformly dispersed therein. The preferred oxidizers are potassium perchlorate ($KClO_4$) and ammonium nitrate which are highly useful in the mixture because they contain a large amount of oxygen available for combustion, because of their stability both alone and in combination with plastic fuels, because of their commercial availability and comparatively low price, and because of their non-hygroscopic character. However, other oxidizing agents such as other perchlorates have been used.

In general, about 3 parts oxidizer per part fuel by weight is used. That is, about three parts of oxidizer to one part copolymer produces a propellant which is sufficiently plastic, substantially impermeable, and at the same time contains the desired excess oxidant. In general, the oxidant will range from 50 to 90 percent by weight of the entire charge.

While this invention is particularly adapted to sealing a propellant grain to a metal case it is not limited thereto. My method is directed to sealing an object within a container by injecting a suitable bonding material into the space between the object and container by means of a pressure gun. As has been said, my invention is particularly useful for bonding a solid propellant charge to the metal motor casing and for that reason I will further described my invention in terms of such bonding.

It is desirable to have the propellant grain held rigidly in place in the motor chamber for several reasons. First, as the propellant burns, a thrust is produced which pushes the grain against the motor chamber and if not properly supported, the grain would tend to turn out of position. Second, if the grain is not sealed in place and a break develops in the restricting coating, the grain can start to burn along the break and since, the products of combustion cannot escape, a back pressure is developed which may force rupture of the motor chamber. In either event, erratic burning conditions are obtained.

The bonding materials generally used are either plastic or elastic. In the case of a plastic material, the deformation of the material in one thermal cycle will permanently deform the material and for that reason an elastomer is preferred. Since there is generally a considerable difference in coefficient of expansion between the grain and case, the elastomer generally preferred is one containing many unconnected voids such as foam rubber.

Such materials will relieve or nearly eliminate stresses in grain caused by difference in expansion or contraction. The chief difficulty in using such materials is that of completely filling the annular space between the grain and the burning chamber walls. As has been indicated, the grain can be coated with the material and forced into place. However, when this method is used, it is difficult to force the grain in place or there will be a space between the case and charge. Another method has been to pour a liquid copolymer of the bonding agent around the grain and then causing the material to set by curing. One difficulty with this method is that air pockets are difficult to eliminate if the grain is closely spaced to the cylinder wall and if it is not closely spaced, then the cross sectional burning area is reduced.

An object of this invention is to provide a method whereby a bonding material can be easily inserted in the space between an object and its container. Another object of this invention is to provide a means for bonding a solid propellent grain to the combustion chamber walls. Still another object of this invention is to provide a means for completely filling the space between a solid propellant and the walls of a containing chamber. Other objects and advantages of this invention will be apparent to those skilled in the art upon reading this disclosure and the attached claims.

According to my invention a propellant grain is bonded to the motor chamber by injecting the bonding agent into the annulus between the grain and the case through a pressure fitting by use of a pressure gun. The propellant can be either placed in the chamber or it can be cast therein. In either case, there will be a space between the chamber and the propellant grain. In either case, the space between the grain and chamber will be small and in general no support will be required to hold the grain away from the chamber wall. That is especially true in the case where the grain is cast in place since there will be irregular projections from the grain which will hold said grain away from the chamber. If it is desired, wedges can be used at both or either end of the grain thereby centering the grain in the container. In the practice of this invention, the open end or ends of the casing will be capped by a metal plate. At least one of these plates will have drilled a plurality of holes located so as to open to the space between the grain and chamber walls and at least two of said holes will be 180° apart. At least one hole will be provided in the motor case, this last hole being equipped with a pressure fitting. A bonding agent of flowable but viscous consistency will be forced through this pressure fitting into the space between the grain and casing until it comes through the plurality of holes not fitted with the pressure fittings (vent holes) and thereby indicating that the space is filled. The means for injecting the bonding material will preferably be so located with respect to the vent holes as to provide for injecting the bonding agent in such a manner as to aid in centering the grain. For example, if only one end of the chamber is provided with vent holes, the pressure fitting will generally be centered at the opposite end of the chamber and the bonding agent forced upward through the inner space between grain and chamber until it reaches the top of the casing as shown by coming through the vent holes.

I have found that satisfactory results can be obtained by inserting two pressure fittings about midway the length of the motor cylinder and 180 degrees apart circumferentially. Two vent holes are placed in each end plate or at each end of the cylinder 180 degrees apart and 90 degrees from the pressure fittings so as to open to the space between the grain and the chamber wall. By simultaneously forcing the bonding agent into the annular space by means of pressure guns attached to both pressure fittings until the bonding material pours out of the vent holes, the inner space will be filled and the bonding agent will help to center the grain. After injecting the bonding material, the holes drilled in the motor casing will be plugged.

Any bonding agent which can be extruded through pressure fitting and which will set or cure to form a plastic or resilient material, such as a plastic or rubbery material, can be used in this invention. Such a material not only supports the grain in place but also serves as the restrictor or the material which confines the burning area to the face of the charge. Such materials are known in the art. For example, it is known that copolymers can be prepared having a viscous consistency before curing by using suitable amounts of modifying agents. C. A. Uraneck and W. M. St. John have described the preparation of such a material in copending application filed April 9, 1954 and having Serial Number 422,254. W. M. Hutchinson and C. A. Uraneck have also described a suitable compounded material in copending application filed July 12, 1954 and having Serial Number 442,879. My invention is not limited to any particular bonding agent, but is applicable for any bonding agent which can be extruded through pressure fittings by use of pressure apparatus.

The preferred bonding agents are those which are resilient after curing. These materials will provide for expansion and contraction of the grain within the case without putting excessive strains on either the case or the grain. Suitable bonding agents include synthetic rubbers such as are prepared by polymerization or copolymerization of conjugated dienes either alone or with copolymerizable monomers. Conjugated dienes employed in the production of these polymers or copolymers are preferably those which contain four to six, inclusive, carbon atoms per molecule but those containing more carbon atoms per molecule, e. g. eight can also be used. Examples of such compounds include 1,3-butadiene, isoprene, piperylene, methylpentadiene, 2,3-dimethyl-1,3-butadiene, 2,3-diethyl-1,3-butadiene, haloprenes such as chloroprene, methylchloroprene, and others. Furthermore, various alkoxy, such as methoxy and ethoxy and cyano derivatives of these conjugated dienes are applicable, i. e., 2-methoxybutadiene and 1-cyanobutadiene.

Materials which are copolymerizable with conjugated dienes include styrene, alpha-methylstyrene, various alkyl-substituted styrenes, vinylnaphthalene, acrylic acid, methacrylic acid, methylacrylate, ethylacrylate, methyl alpha-chloroacrylate, methyl methacrylate, ethyl methacrylate, acrylonitrile, methacrylonitrile, methyl isopropenyl ketone, methyl vinyl ether, vinyl acetate, vinyl chloride, vinylidene chloride, vinylfurane, vinylcarbazole, trialkyl cyanurate, halogen-substituted styrenes, alkoxy-substituted styrenes, vinyl substituted heterocyclic nitrogen bases of the pyridine and quinoline series such as 2-vinylpyridine, 2-methyl-5-vinylpyridine, 3-vinylquinoline, polyvinyl compounds such as divinylbenzene, trivinylbenzenes, di(alpha-methylvinyl)benzenes, divinylnaphthalenes, trivinylnaphthalene, divinyldiphenyl, divinyl sulfide, divinyl sulfone, divinyl ether, ethylene glycol, propylene glycol, butylene glycol, hexylene glycol, octylene glycol, glycerine, 1,2,4-trihydroxybutane, 1,2,6-trihydroxyhexane, 1,2,3,4-tetrahydroxybutane, etc.

In general, for the copolymer to have rubbery properties after curing or vulcanizing, the copolymer will have a preponderance of the conjugated dienes. However, polymer modifiers can be used such as sulfur containing compounds such as mercaptans, organic sulfides, thio and dithioic acids and salts, xanthogenic acids and salts, thio-carbamic acids and salts, etc.

It is also within the scope of this invention to use vulcanizing agents such as sulfur, p,p'dibenzoylquinonedioxide, p-quinonedioxine, etc.

However, no particular bonding agent is required in my invention, the only requirement being that the material be capable of being extruded by means of pressure equipment and that it set to a solid mass upon suitable curing. The compounds or monomeric materials listed are for the purpose of showing the wide range of materials which are applicable as the bonding agent and is in no way intended to be exhaustive.

I will further illustrate my invention by referring to the attached drawings of which:

Figure 1:
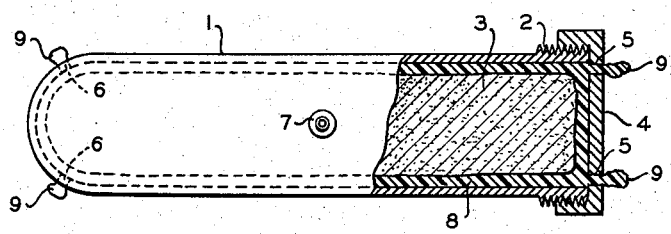
Figure 1 is an elevation view, partially in section, of a solid object within a container showing the arrangement of the pressure fittings and vent holes wherein the container is closed at one end.

Referring to Figure 1, rocket engine combustion chamber 1 adapted by threads 2 to receive an ignition and power head (not shown) has propellant grain 3 placed therein either by pouring in place or by inserting a precast form. Temporary plate 4 is placed over the open end of the chamber 1, such as, by screwing on threads 2. This plate 4 has two holes 5 drilled therein 180 degrees apart so as to open at the annulus between the grain and chamber wall. Vent holes 6 are drilled at the opposite end of the chamber generally 180 degrees apart and having their centers in a plane passing through the centers of the first said two holes. Approximately mid-way the length of the chamber and 90 degrees from the first said holes will be drilled two other holes 180 degrees apart. These last said holes will be tapped and fitted with pressure fittings 7. A suitable bonding material 8 is forced, by means of pressure guns, through the said pressure fittings and into the annular space between the grain and chamber walls until the bonding material comes out through vent holes 5 and 6 forming stringers 9. If it is desired, instead of two vent holes 6, a single vent can be used in the extreme end of the chamber thus filling the space between holes 6. However, this should not be required since no burning can take place here until the fuel is exhausted. The assembly is then placed in an oven at a suitable temperature to cause the bonding material to set. The stringers are cut off and the temporary plate and the pressure fittings removed. The remaining holes are tapped and plugs inserted in all of the tapped holes. The assembly is then fitted with a suitable exhaust and ignition head. In cleaning and tapping these holes, care should be taken not to penetrate the bonding material since to do so would create the danger of igniting the fuel.

Figures 2, 3:
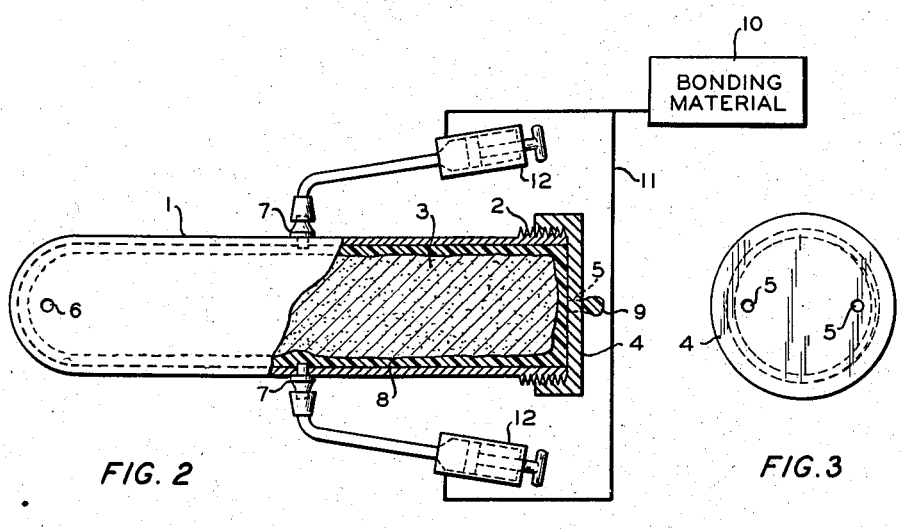
Figure 2 is an elevation view, partially in section, of the container of Figure 1 rotated 90 degrees and shows the pressure guns attached.
Figure 3 is an end view of the container of Figure 2 showing the location of the vent holes.

Referring to Figures 2 and 3 the same reference numerals are used to indicate the same parts. Figure 2 shows a source of bonding material 10 being fed via conduits 11 to pressure guns 12. These guns are operably connected to pressure fittings 7.

Figure 4:
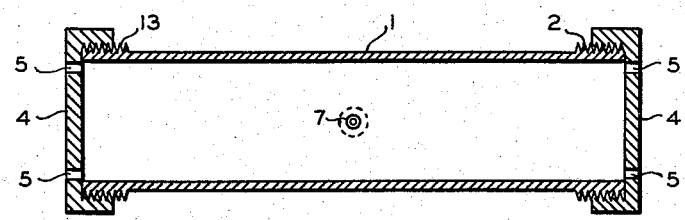
Figure 4 is a sectional view of a cylindrical container with two removable end plates and shows the relative location of the vent holes and the pressure fittings.

Referring to Figure 4, the chamber 1 is adapted by means of thread 2 to receive the ignition head and by threads 13 for receiving an undrilled bottom plate. The remaining reference numerals are used for like parts as were used for describing the other figures.

The end plates 4 are shown as utilizing only part of the threads. Since the pressure encountered by injecting the bonding material is comparatively small as compared to the pressures generated upon firing, it is not necessary to provide for full threading of these temporary plates. Since it is simpler to put on plates 4 and then drill and tap the holes for fittings 7, I have described my invention by this sequence of operation. Also, since the fluid extruded through holes 6 must be removed before plugging, it is preferable to delay tapping for the permanent plugs until after injecting the bonding agent. However, it should be understood that the particular sequence for performing these operations is optional and can be done in any order as desired.

I will further describe my invention by the following examples. It should be understood that this example is for the purpose of illustration only and I am not limited to any particular bonding agent, propellant or sequence of steps as shown.

A propellant grain comprising fuel, oxidant, and binder, said grain being 3.0 inches in diameter, was bonded to a 3.125 inch inside diameter metal case five inches in length. Wall thickness of the case was approximately 0.187 inch. At the middle of the case lengthwise and 180 degrees apart circumferentially were two holes fitted with pressure fittings.

The grain was first cast and cut to length. The grain was placed in the cylinder and supported in place by three thin wooden wedges at each end. Metal plates were placed over each end of the case and grain and the whole assembly held in place by means of a vise. The two metal plates each had two holes drilled therein at the annulus, 180 degrees apart and 90 degrees from the grease fittings. A bonding agent of the following composition was used.

| | Parts by weight |
|---|---|
| Copolymer of 90/10 BD/MVP plus 10 parts carbon black having a Mooney value of 10 | 110 |
| Liquid copolymer of 95/5 butadiene and divinyl benzene | 100 |
| Amylbiphenyl | 15 |
| Benzophenone | 15 |
| Epichlorohydrin | 6 |
| Sulfur | 2 |
| Zinc oxide | 6 |
| Butyl Zimate[1] | 6 |

[1] Zinc dibutyldithiocarbamate.

The bonding agent was compounded in a "Baker-Perkins" mixer equipped with dispersion type blades. After compounding, the bonding agent was ejected into the annulus between grain and case until it began to flow from the small holes in the end plates by means of a hand type grease gun. The end plates were then removed, the grease fitting replaced by plugs and the grain and case placed in an oven to cure the bonding agent.

Five grains prepared as described above were shock cycled and then successfully fired. Shock cycling consists of placing the grain, together with a grain of similar dimensions which has a thermocouple imbedded therein, into a cold chamber. When the thermocouple indicates the temperature has reached $-65\pm5°$ F. the grains are transferred to an oven where they are heated until the thermocouple indicates a temperature of $175\pm5°$ F. The grains are again transferred to the cold chamber and the temperature is lowered to $-65\pm5°$ F. where they remain until ready for use.

I have described my invention in terms of bonding a solid propellant to a metal casing, however, my invention is equally applicable for bonding objects in other containers of other materials particularly where the thickness of the space between the object and container is small. In general, the space will not exceed 2 percent of the diameter of the object being bonded. As the space gets smaller, it becomes more difficult to pack the space with the bonding material and the method of my invention becomes particularly advantageous. If the object and container are very closely spaced, for example, hand tight, no head plate will be required. In this latter case, four or more pressure fittings will generally be used to insure the bonding agent being dispersed throughout the inner space.

I claim:

1. A method of preparing a rocket engine for firing comprising preforming a solid propellant grain having outside dimentions slightly smaller than the combustion chamber of said rocket engine, placing said grain in said combustion chamber, supporting said grain uniformly from the walls of said chamber thereby providing an annular space between said grain and said chamber, capping said chamber with a temporary plate, providing a plurality of openings through said plate to said annular space, providing at least one pressure fitting in said chamber at a position remote from said openings, injecting a flowable bonding material capable of being cured to a firm set into said annular space until bonding agent extrudes through said opening, curing said bonding agent, and passing the resulting assembly through a shock cycle.

2. The method of claim 1 wherein said shock cycle comprises lowering the temperature of the assembly to within the range of minus 60 to minus 70° F., then raising the temperature to within the range of 170–180° F. and lowering the temperature to said lower range.

3. A method of bonding a cylindrical propellant grain to a cylindrical rocket engine chamber, said chamber being closed at one end and open at the other end and said grain substantially filling said chamber so as to provide an annulus therebetween, said method comprising operably installing a plurality of evenly spaced pressure fittings circumferentially through the walls of said chamber approximately midway the chamber's length so as to open to said annulus, at least two of said fittings being installed 180° apart; capping the open end of said chamber; providing a plurality of vent holes at each end of said chamber opening to said annulus so that at least two of said vents at each end of said chambers are 180° apart and 90° from two of said pressure fittings; pressure injecting a flowable bonding material capable of being set by curing through said pressure fittings until part of said bonding material is extruded through all of said vent holes; and curing the bonding agent in the resulting assembly.

4. The method of claim 3 wherein said annulus has a thickness of not more than 1 percent of the diameter of said grain.

5. The method of claim 4 wherein the bonding material comprises a rubber polymer.

6. The method of claim 5 wherein the bonding material is vulcanized.

7. A method of bonding a propellant grain to the walls of a rocket engine combustion chamber which comprises operably installing a plurality of pressure fittings around said combustion chamber approximately midway the length thereof, capping the open end of said combustion chamber, providing a plurality of vents at each end of said combustion chamber so as to open to the space between said chamber and said propellant grain, pressure injecting a flowable bonding material capable of being set upon curing into said space between said grain and said chamber through said pressure fittings until part of said bonding agent is extruded through all of said vents removing said pressure fitting and plugging the resulting openings, and curing said bonding agent in the resulting assembly.

8. A method of preparing a rocket engine combustion chamber for use, said method comprising coating a propellant composition in place in said combustion chamber, allowing said grain to cool thereby contracting and pulling away from said chamber forming an annulus therebetween, operably installing a plurality of pressure fittings circumferentially around said combustion chamber, capping the open end of said combustion chamber, providing a plurality of vents at each end of said combustion chamber opening to said annulus, pressure injecting a flowable bonding material capable of forming a set upon curing into said annulus through said pressure fitting until said annulus is filled, removing said pressure fittings, plugging all openings, curing said bonding material until set, uncapping the chamber, and passing the resulting assembly through a shock cycle.

9. The method of claim 8 wherein said bonding material comprises a synthetic rubber copolymer having vulcanizing agents incorporated therein and wherein said shock cycle comprises lowering the temperature to within the range of minus 60 to minus 70° F., raising the temperature to within the range of 170 to 180° F. and again lowering the temperature to within the range of minus 60 to minus 70° F.

10. The method of claim 8 wherein the bonding material comprises a synthetic copolymer of butadiene and 2-methyl-5-vinylpyridine compounded with a liquid copolymer of butadiene and divinylbenzene.

11. A method of preparing a rocket engine for firing comprising preforming a solid propellant grain having outside dimensions slightly smaller than the combustion chamber of said rocket engine, placing said grain in said combustion chamber, supporting said grain uniformly from the walls of said chamber thereby providing an annular space between said grain and said chamber, capping said chamber, providing at least one opening through the capped chamber to said annular space, providing at least one pressure fitting in said capped chamber to said annular space remote from said opening, injecting a flowable material capable of being cured to a firm set through said pressure fitting into said annular space until said flowable material extrudes through said opening, and curing said flowable material in place until set.

References Cited in the file of this patent
UNITED STATES PATENTS

| | | |
|---|---|---|
| 2,160,108 | Reid | May 30, 1939 |
| 2,234,238 | Forsberg | Mar. 11, 1941 |
| 2,407,559 | Krotz (I) | Sept. 10, 1946 |
| 2,438,348 | Morin | Mar. 23, 1948 |
| 2,479,470 | Carr | Aug. 16, 1949 |
| 2,616,481 | Twells et al. | Nov. 4, 1952 |
| 2,623,465 | Jasse | Dec. 30, 1952 |
| 2,689,755 | Krotz (II) | Sept. 21, 1954 |